US010821609B2

(12) United States Patent
Tokuhashi et al.

(10) Patent No.: US 10,821,609 B2
(45) Date of Patent: Nov. 3, 2020

(54) ROBOT CONTROL APPARATUS, SYSTEM AND METHOD

(71) Applicant: Hitachi, Ltd., Tokyo (JP)

(72) Inventors: Kazumasa Tokuhashi, Tokyo (JP); Yoshitaka Hiramatsu, Tokyo (JP); Toshimitsu Takahashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 343 days.

(21) Appl. No.: 15/904,472

(22) Filed: Feb. 26, 2018

(65) Prior Publication Data

US 2019/0084161 A1 Mar. 21, 2019

(30) Foreign Application Priority Data

Sep. 15, 2017 (JP) ................................. 2017-177286

(51) Int. Cl.
*B25J 13/00* (2006.01)
*G05D 1/00* (2006.01)
(Continued)

(52) U.S. Cl.
CPC ........... *B25J 13/006* (2013.01); *B25J 9/0084* (2013.01); *B25J 9/1602* (2013.01); *B25J 9/1682* (2013.01);
(Continued)

(58) Field of Classification Search
CPC ...... B25J 13/006; B25J 11/008; B25J 9/1682; B25J 9/0084; B25J 9/1602; B25J 9/1694;
(Continued)

(56) References Cited

U.S. PATENT DOCUMENTS 8,830,057 B1 * 9/2014 Poursohi .............. G08B 21/182
340/540
9,233,472 B2 * 1/2016 Angle .................... B25J 13/006
(Continued)

FOREIGN PATENT DOCUMENTS

JP 2007-334868 A 12/2007
JP 4658892 B2 3/2011
JP 4856510 B2 1/2012

OTHER PUBLICATIONS

Japanese Office Action received in corresponding Japanese Application No. 2017-177286 dated Apr. 21, 2020.

*Primary Examiner* — Jaime Figueroa
(74) *Attorney, Agent, or Firm* — Mattingly & Malur, PC

(57) ABSTRACT

A robot control apparatus that performs communication with a plurality of robots R according to a communication environment includes: a wireless communication environment map creation unit that collects communication environment data transmitted from the plurality of robots and creates a wireless communication environment map; a service determination unit that determines change in services to be performed by the plurality of robots on the basis of the created wireless communication environment map; and a communication interface that performs communication with the plurality of robots using the wireless communication environment such as a wireless communication access point. The service determination unit determines a change process of dispositions of the plurality of robots, a stop process and a restoration process of functions thereof, or a change process of the service scenarios thereof on the basis of the wireless communication environment map.

15 Claims, 14 Drawing Sheets

(51) Int. Cl.
- *B25J 11/00* (2006.01)
- *B25J 9/00* (2006.01)
- *B25J 9/16* (2006.01)
- *G05D 1/02* (2020.01)

(52) U.S. Cl.
CPC .......... *B25J 9/1694* (2013.01); *B25J 11/008* (2013.01); *G05D 1/0027* (2013.01); *G05D 1/0044* (2013.01); *G05D 1/0291* (2013.01); *G05B 2219/39146* (2013.01); *G05D 2201/02* (2013.01)

(58) Field of Classification Search
CPC .. G05D 1/0044; G05D 1/0027; G05D 1/0291; G05D 2201/02; G05B 2219/39146
USPC ......................................................... 700/245
See application file for complete search history.

(56) References Cited

U.S. PATENT DOCUMENTS

| | | | |
|---|---|---|---|
| 9,375,847 B2* | 6/2016 | Angle | H04L 12/282 |
| 9,599,990 B2* | 3/2017 | Halloran | A47L 9/1409 |
| 9,689,696 B1* | 6/2017 | Russell | G05D 1/0287 |
| 9,948,380 B1* | 4/2018 | Vos | H04B 7/18506 |
| 10,168,709 B2* | 1/2019 | Kleiner | G05D 1/0219 |
| 10,241,478 B2* | 3/2019 | Hickman | H04N 7/185 |
| 2003/0060930 A1* | 3/2003 | Fujita | G06N 3/008 700/245 |
| 2007/0178911 A1* | 8/2007 | Baumeister | G01S 1/022 455/456.1 |
| 2007/0192910 A1* | 8/2007 | Vu | B25J 5/007 700/245 |
| 2008/0086236 A1 | 4/2008 | Saito et al. | |
| 2011/0054689 A1* | 3/2011 | Nielsen | G05D 1/0088 700/258 |
| 2013/0035790 A1* | 2/2013 | Olivier, III | G05D 1/0246 700/246 |
| 2013/0325244 A1* | 12/2013 | Wang | G05D 1/028 701/26 |
| 2014/0207281 A1* | 7/2014 | Angle | H04L 12/282 700/257 |
| 2015/0367513 A1* | 12/2015 | Gettings | B25J 9/1664 700/248 |
| 2016/0360429 A1* | 12/2016 | Li | H04W 88/08 |
| 2017/0085417 A1* | 3/2017 | O'Reirdan | H04L 43/0811 |
| 2018/0299899 A1* | 10/2018 | Suvarna | H04W 24/08 |
| 2018/0321687 A1* | 11/2018 | Chambers | G06Q 30/0261 |

* cited by examiner

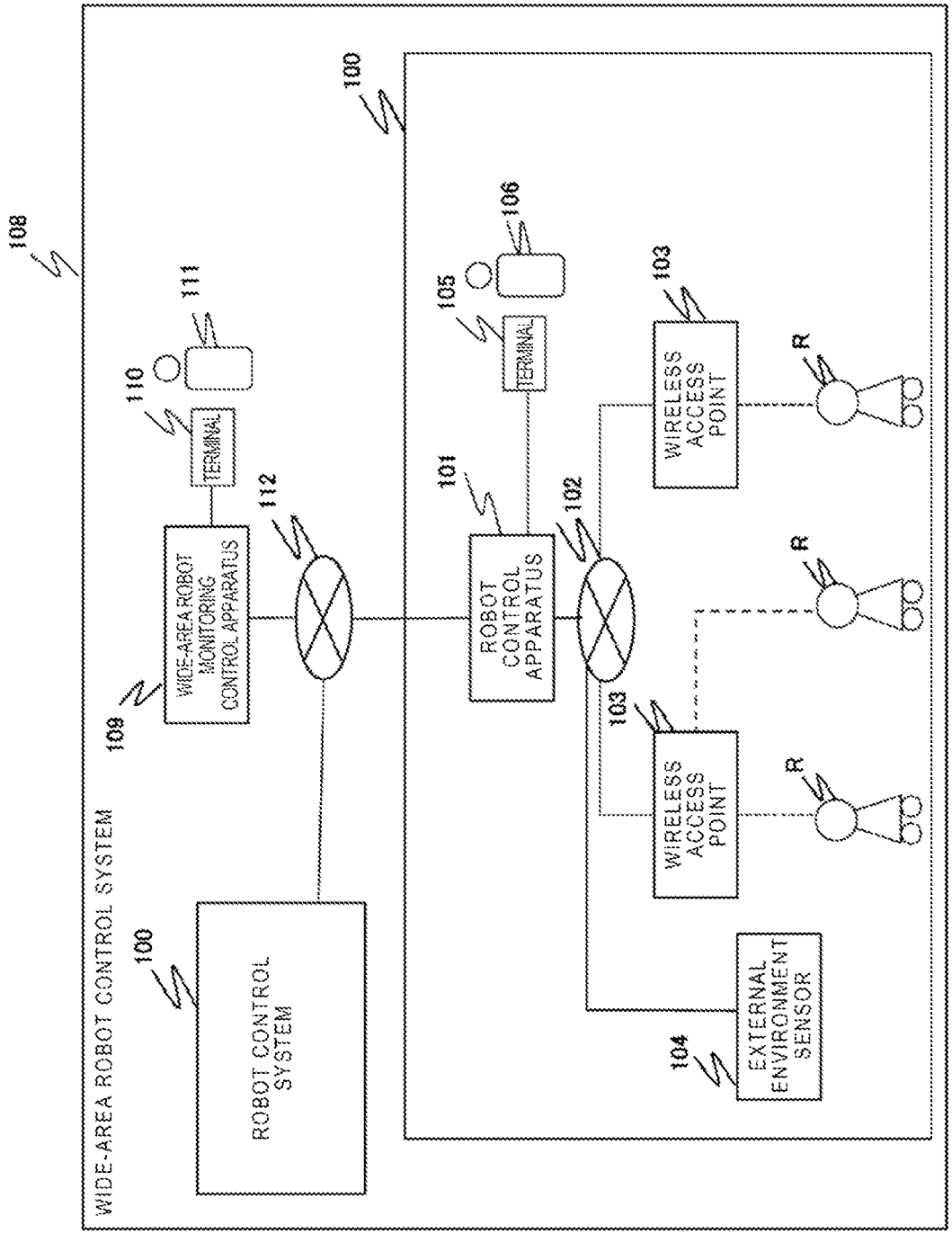

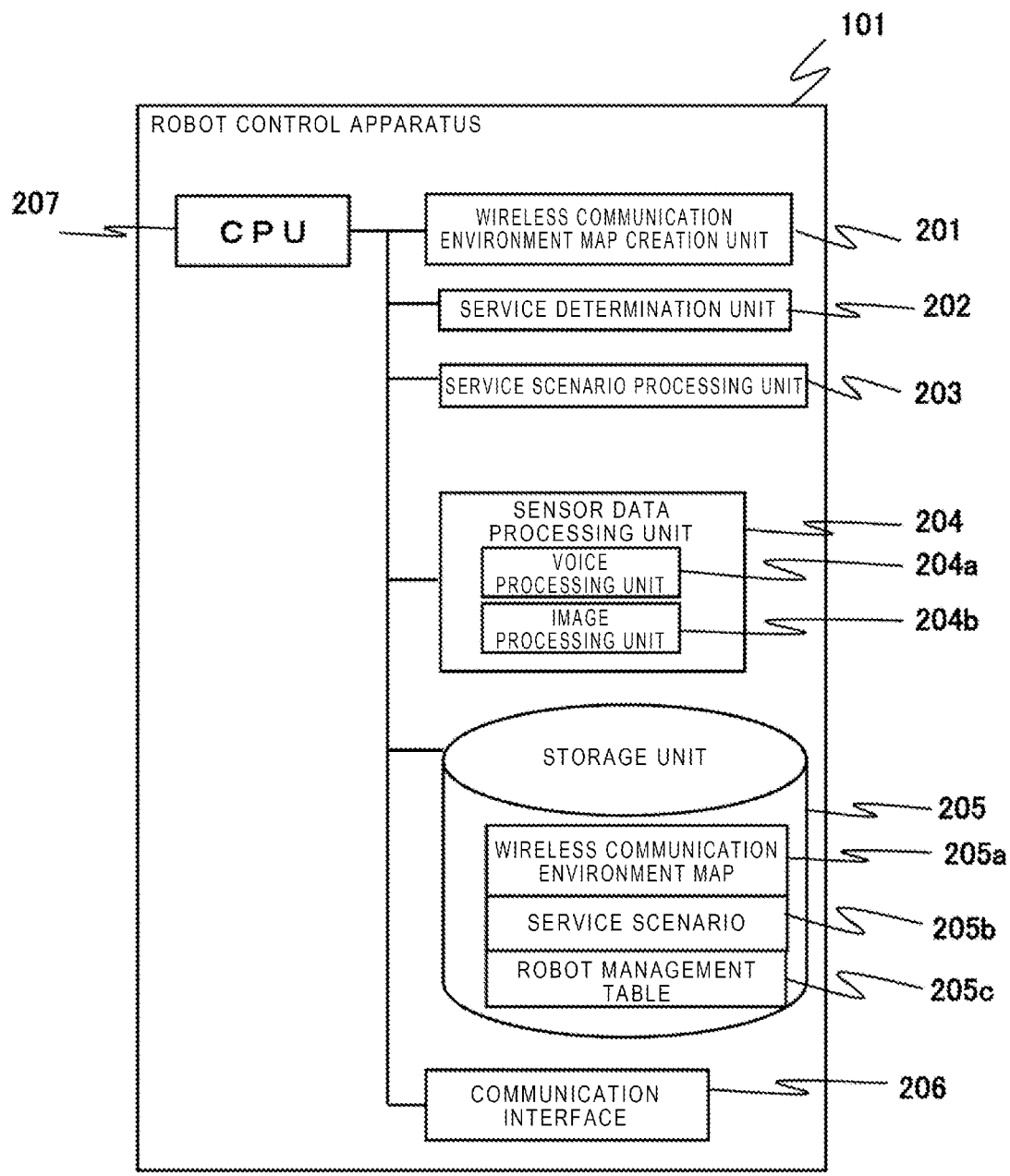

ROBOT CONTROL APPARATUS, SYSTEM AND METHOD

CLAIM OF PRIORITY

The present application claims priority from Japanese patent application JP2017-177286 filed on Sep. 15, 2017, the content of which is hereby incorporated by reference into this application.

BACKGROUND OF THE INVENTION

Field of the Invention

The present invention relates to a robot control apparatus, and particularly, relates to a robot control technique that controls services of a plurality of robots in accordance with a communication environment.

Background Art

A robot is provided with various sensors such as a microphone, a camera, or the like. In order to execute an advanced process such as voice recognition or image recognition, there is also a system in which, in addition to a robot itself, the robot communicates with an external computer, receives serif after voice recognition or image recognition that is a processing result of the external computer or an operation instruction, and performs services. Further, there is a case where a robot is connected to another business system or a server on a cloud through a network or the like to provide services. Further, a robot that autonomously moves needs to be connected to a wireless access point so as to access an external computer.

A robot that utilizes a wireless access point that uses a general-purpose frequency band in a local area network (LAN) instead of an exclusive line, a mobile network, or the like is not guaranteed in its communication band, and is easily affected by communication with other devices. In addition, as a wireless intensity of the wireless access point becomes lower as the robot becomes distant from the wireless access point, and also, the wireless intensity is affected by an obstacle, so that the wireless intensity is lowered. Thus, in a case where the robot moves and a position relationship between the robot and the wireless access point is changed, its communication environment is easily changed. As known examples of techniques that disclose a control method with respect to a robot based on such a communication environment, Japanese Patent No. 4658892, Japanese Patent No. 4856510, and the like have been proposed.

SUMMARY OF THE INVENTION

However, in the above-described related arts, a presumption that a plurality of robots are managed and controlled by an external control apparatus and perform services in real time is not considered. Thus, in service management that is the presumption, there is a case where, in a case where communication situations are changed from an environment that is initially set due to a congestion degree of persons, an obstacle such as a desk, installation of other devices such as another communication device or a monitoring camera and change in usage situations thereof, change in robot operation situations, or the like, it is not possible to appropriately control a robot operation.

An object of the present invention is to provide a robot control apparatus, a robot control system, and a control method in the robot control apparatus that appropriately control a plurality of robots to perform services even in a case where communication situations are changed due to installation of other devices and change in usage situations thereof, change in robot operation situations, or the like.

According to an aspect of the present invention, there is provided a robot control apparatus that performs communication with a plurality of robots according to a communication environment, including: a communication interface that performs communication with the plurality of robots using the communication environment; a wireless communication environment map creation unit that collects communication environment data transmitted from the plurality of robots through the communication interface, and creates a wireless communication environment map; and a service determination unit that determines services to be performed by the plurality of robots on the basis of the created wireless communication environment map.

Further, according to another aspect of the present invention, there is provided a robot control system including a plurality of robots and a robot control apparatus that performs communication with the plurality of robots according to a communication environment. The robot includes a communication environment measurement unit that measures communication environment data of the communication environment, and a communication interface that transmits the communication environment data to the robot control apparatus using the communication environment. The robot control apparatus includes a wireless communication environment map creation unit that collects the communication environment data transmitted from the plurality of robots and creates a wireless communication environment map, a service determination unit that determines services to be performed by the robots on the basis of the created wireless communication environment map, and a communication interface that performs communication with the plurality of robots using the communication environment, and transmits the wireless communication environment map created by the wireless communication environment map creation unit to the robots.

Furthermore, according to still another aspect of the present invention, there is provided a control method in a robot control apparatus that performs communication with a plurality of robots according to a communication environment, including collecting communication environment data transmitted from the plurality of robots, and creating a wireless communication environment map; and determining services to be performed by the robots on the basis of the created wireless communication environment map.

Even in a case where communication situations are changed from an environment that is initially set due to installation of other devices and change in usage situations thereof, change in robot operation situations, or the like, it is possible to appropriately control a plurality of robots to perform services.

BRIEF DESCRIPTION OF THE DRAWINGS

FIG. 1B is a diagram showing an example of an entire configuration of a wide-area robot control system according to an embodiment.

FIG. 2 is a block diagram showing an example of a configuration of a robot control apparatus according to an embodiment.

DETAILED DESCRIPTION OF THE INVENTION

Hereinafter, embodiments for realizing the present invention will be sequentially described with reference to the accompanying drawings. In this specification, it is assumed that changes in services of a robot are divided into a change in a function of the robot and a change in a disposition of the robot, and the function change includes function stop and restoration, and a change in a service scenario.

Embodiments

The present embodiments relate to a robot control apparatus, a robot control system, and a method thereof for determining services provided by robots in accordance with wireless environments. That is, the embodiments relate to a robot control apparatus that performs communication with a plurality of robots under communication environments and includes a communication interface that performs communication with the plurality of robots using the communication environments, a wireless communication environment map creation unit that collects communication environment data transmitted from the plurality of robots through the communication interface and creates a wireless communication environment map, and a service determination unit that determines services to be performed by the plurality of robots on the basis of the created wireless communication environment map, and a control method thereof.

Further, the embodiments relate to a robot control system that includes a plurality of robots and a robot control apparatus that performs communication with the plurality of robots under communication environments, in which each robot includes a communication environment measurement unit that measures communication environment data on the communication environments and a communication interface that transmits the communication environment data to the robot control apparatus using the communication environments, in which the robot control apparatus includes a wireless communication environment map creation unit that collects the communication environment data transmitted from the plurality of robots and creates a wireless communication environment map, a service determination unit that determines services to be performed by the plurality of robots on the basis of the created wireless communication environment map, and a communication interface that performs communication with the plurality of robots using the communication environments, and in which the wireless communication environment map created by the wireless communication environment map is transmitted to the robots.

Robot Control System

Figure 1A:
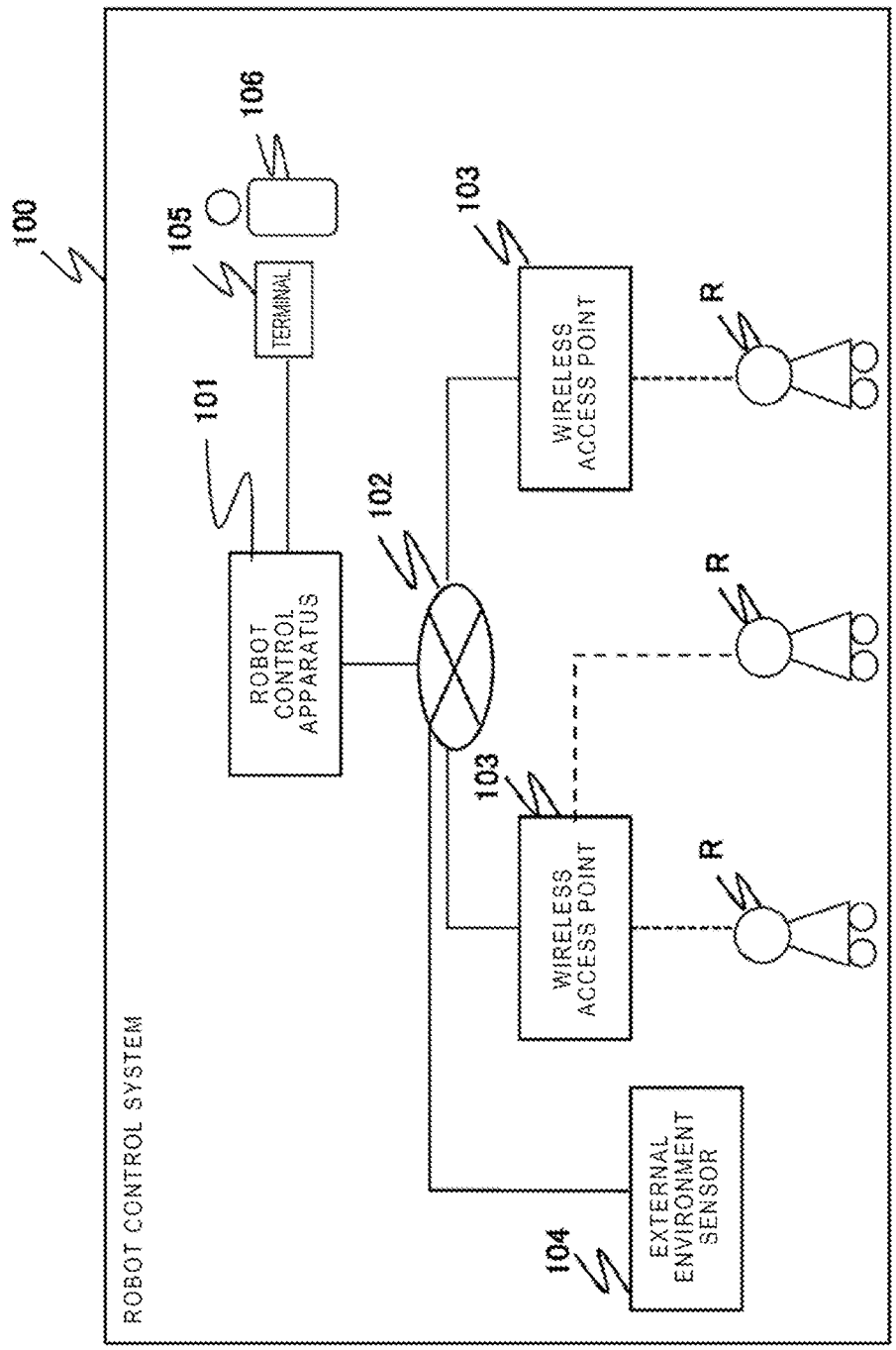
FIG. 1A is a diagram showing an example of an entire configuration of a robot control system according to an embodiment.

An example of an entire configuration of the robot control system according to this embodiment will be described. FIG. 1A is a diagram showing an example of an entire configuration of the robot control system.

As shown in FIG. 1, a robot control system 100 according to this embodiment includes a robot control apparatus 101, a network 102, an external environment sensor 104 connected through the network 102, a wireless access point 103, and a plurality of robots R disposed in a movement assumption area through the wireless access point 103. The robot control apparatus 101 controls services or operations of the plurality of robots R through the network 102. Further, the robot control apparatus 101 receives data acquired by each robot R or the external environment sensor 104 through the network 102, and performs a part of voice processing or image processing. Here, the external environment sensor 104 represents, for example, a monitoring camera, or the like. The number of the robots R and the number of the wireless access points 103 are not limited to numbers shown in FIG. 1A.

The robot R performs voice recognition, utterance, movement, or the like in the movement assumption area where services are to be provided on the basis of an instruction or a service scenario from the robot control apparatus 101, and executes services such as information presentation, dialogues, or road guidance for an end user. Further, the robot R is not limited to one sort of robot, and includes a moving type robot, a stationary type robot, a transport robot, a digital signage, or the like. In addition, the number of the robots R to be disposed is not limited to one, and services based on linkage between a plurality of robots R are also provided according to an instruction of the robot control apparatus 101.

In the robot control system 100 of the above-described embodiment, there is a case where a communication speed is lowered or wireless communication between the wireless access point 103 and the robot R is disconnected, in accordance with an executed service or a movement distance of each robot R, due to a communication environment such as a wireless intensity in a network that includes the network 102 and the access point 103, for example. In such a case, the robot control apparatus 101 changes services of each robot R disposed in the movement assumption area, and the robot R is operated in a degenerate mode in which its function is degenerated and autonomously moves to a restorable position. Such a service change based on wireless environment will be described in detail later.

Further, for example, the scale of the robot control system 100 is configured by a building, a room of the building, or the like, and in this case, the network 102 represents a LAN, or the like. The robot control apparatus 101 communicates with the robots R or the like, through the wireless access point 103 such as the IEEE802.11 standard. Further, the robot control apparatus 101 may be configured using another mobile network, or the like.

Further, as the entire configuration of the robot control system 100, as shown in FIG. 1B, the robot control system 100 may be connected to an external system through a wide-area network 112 to configure a wide-area robot control system. Further, for example, a configuration in which a wide-area robot monitoring control apparatus 109 is provided at a data center may be considered. The robot control apparatus 101 notifies the wide-area robot monitoring control apparatus 109 of situations of the robots R that are operated in the robot control system 100, so that the wide-area robot monitoring control apparatus 109 may monitor the operation situations of the robots R of each robot control system 100. In addition, the functions of the robot control apparatus 101 may be partially or totally transferred to the wide-area robot monitoring control apparatus 109. The number of the robot control systems 100 connected to the wide-area network 112 in FIG. 1B may be two or more.

In FIGS. 1A and 1B, terminals 105 and 110 are input devices used by managers 106 and 111, and may employ a note-type computer, a tablet terminal, or the like. Further, in a case where the terminals 105 and 110 are directly operated by the managers 106 and 111 using a wireless environment communication map (which will be described later), the terminals 105 and 110 also function as display input devices for inputting service menus of the robots R. In addition, although not shown in FIGS. 1A and 1B, the terminal 105 may be connected to the network 102, and the manager 106 may access the robot control apparatus 101 through the network 102. Further, the terminal 105 may be connected to the wireless access point 103, and the manager 106 may access the robot control apparatus 101 through the network 102. In addition, the robot control apparatus 101 may be configured of two or more computers in which functions to be executed are separately provided. Further, for example, the robot control apparatus 101 may employ a general-purpose computer. The wide-area robot monitoring control apparatus 109 may also be configured of two or more computers.

Configuration of Robot Control Apparatus 101 and Robot R

FIG. 2 is a block diagram showing an example of a configuration of the robot control apparatus 101 of the robot control system according to this embodiment. The robot control apparatus 101 that is configured of one or more computers includes a wireless communication environment map creation unit 201, a service determination unit 202, a service scenario processing unit 203 that executes services of the robot R, and a sensor data processing unit 204 that processes sensor data such as voice or images received from the robot R, as functional components realized by program execution of a central processing unit (CPU 207), and also includes a storage unit 205 and a communication interface 206 capable of communicating with an external device such as the robot R. The sensor data processing unit 204 includes a voice processing unit 204a and an image processing unit 204b. The storage unit 205 stores a wireless communication environment map 205a, a service scenario 205b, a robot management table 205c, or the like, in addition to various programs executed by the CPU 207. The service scenario 205b includes an operation, utterance, dialogues or the like of the robot R, and the robot R provides services in accordance with the service scenario 205b. The number of service scenarios 205b is not limited to the configuration of this embodiment, and a plurality of service scenarios may be stored. The robot management table 205c corresponds to a table for collecting and managing information accumulated in robot management tables 306c by collection of data such as service correspondence records or recognition rates in the plurality of robots R (which will be described later).

The wireless communication environment map creation unit 201 creates a wireless communication environment map on the basis of wireless communication environment data transmitted from the respective robots R. The wireless communication environment map creation unit 201 will be described later. The service determination unit 202 determines a change in services to be executed by each robot R in accordance with the created wireless communication environment map. That is, the wireless communication environment map creation unit 201 creates a wireless communication environment map on the basis of a communication environment change or at predetermined intervals, and the service determination unit 202 determines whether it is necessary to change an existing service scenario on the basis of the created latest wireless environment map. This will be described later.

In the robot control system of this embodiment, in order to realize services to be executed by each robot R, including services after change determined by the service determination unit 202, it is possible to execute a service scenario to be specifically performed by the robot R according to an instruction of the robot control apparatus 101. In such a case, a configuration in which the service scenario 205b of the robot R stored in the storage unit 205 is processed by the service scenario processing unit 203 of the robot control apparatus 101 and an operation instruction is output to the corresponding robot R through the communication interface 206 is used. With such a configuration, it is possible to provide services based on linkage between the plurality of robots R under the control of the robot control apparatus 101.

Figure 3:
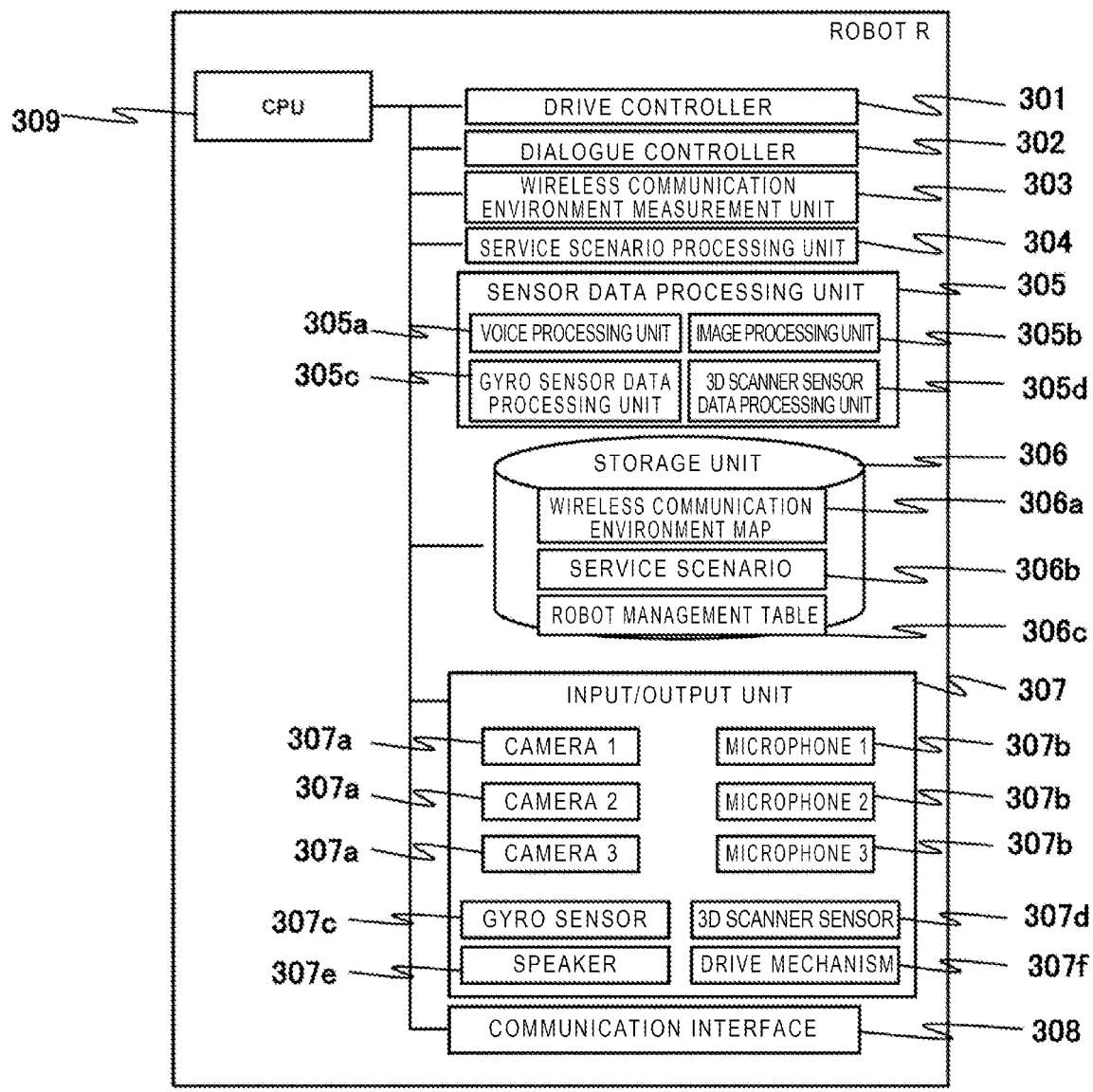
FIG. 3 is a block diagram showing an example of a configuration of a robot according to an embodiment.

FIG. 3 is a block diagram showing an example of a configuration of the robot R of this embodiment. The robot R includes a drive controller 301, a dialogue controller 302, a wireless communication environment measurement unit 303, a service scenario processing unit 304, and a sensor data processing unit 305, as functional components realized by program execution of the CPU 309 of a computer. The sensor data processing unit 305 includes a voice processing unit 305a, an image processing unit 305b, a gyro sensor data processing unit 305c, and a 3D scanner sensor data processing unit 305d. Further, in a storage unit 306, a wireless communication environment map 306a, a service scenario 306b, and a robot management table 306c are stored.

In addition, the robot R includes a camera 307a, a microphone 307b, a gyro sensor 307c, a 3D scanner sensor 307d, a speaker 307e, and a drive mechanism 307f, as an input/output unit 307, and also includes a communication interface 308 capable of communicating with an external device such as the robot control apparatus 101.

On the basis of the service scenario 205b that is stored in the storage unit 205 of the robot control apparatus 101 and is processed in the service scenario processing unit 203, or on the basis of the service scenario 306b of the robot R, the service scenario processing unit 304 of the robot R executes various services such as reception or guidance. Here, utterance is performed through the speaker 307e of the input/output unit 307 of the robot R in accordance with an instruction of the service scenario processing unit 203 of the robot control apparatus 101 or the service scenario processing unit 304 of the robot R, driving is performed by the drive mechanism 307f, and data is input through the camera 307a, the microphone 307b, and the 3D scanner sensor 307d. Further, an obstacle is detected on the basis of the camera 307a and the 3D scanner sensor 307d. The robot R provides services in accordance with any one or both of the service scenario 205b stored in the robot R and the service scenario 306b stored in the robot control apparatus 101.

The robot R processes a variety of data acquired by the input/output unit 307 in the sensor data processing unit 305 of the robot R. With respect to image or voice data acquired through the camera 307a or the plurality of microphones 307b, the robot R transmits the acquired data to the robot control apparatus 101 that is an external computer for data processing. The robot control apparatus 101 processes the acquired data of each robot R in the voice processing unit 204a or the image processing unit 204b, transmits a processing result to each robot R, and performs the service scenario 205b to be processed by the service scenario processing unit 203, or the service scenario 306b to be processed by the service scenario processing unit 304, such as a dialogue. The voice processing unit 305a and the image processing unit 305b in the robot R are used for easily processing voice and image data, for example, are used in a typical conversation, for example, and are used in a case where external connection is not possible, such as a degenerate mode in disconnection of communication. The degenerate mode will be described later. The numbers of the cameras 307a, the microphones 307b, and other sensors are not limited to shown numbers, and may not be provided. Further, other sensors such as an ultrasonic sensor or a temperature sensor may be mounted.

The service scenario 306b is not only stored in the robot R in advance, but may also be transmitted and updated from the robot control apparatus 101 as necessary. The number of the service scenarios 306b is not limited to a number shown in this embodiment, and a plurality of service scenarios may be stored. The storage unit 205 and the storage unit 306 may employ a hard disk drive, an optical disc drive, a semiconductor memory device, or the like that is internally provided in or externally attached to each computer, for example.

Outline Showing Example of Entire Operation of this Embodiment

Figure 4:
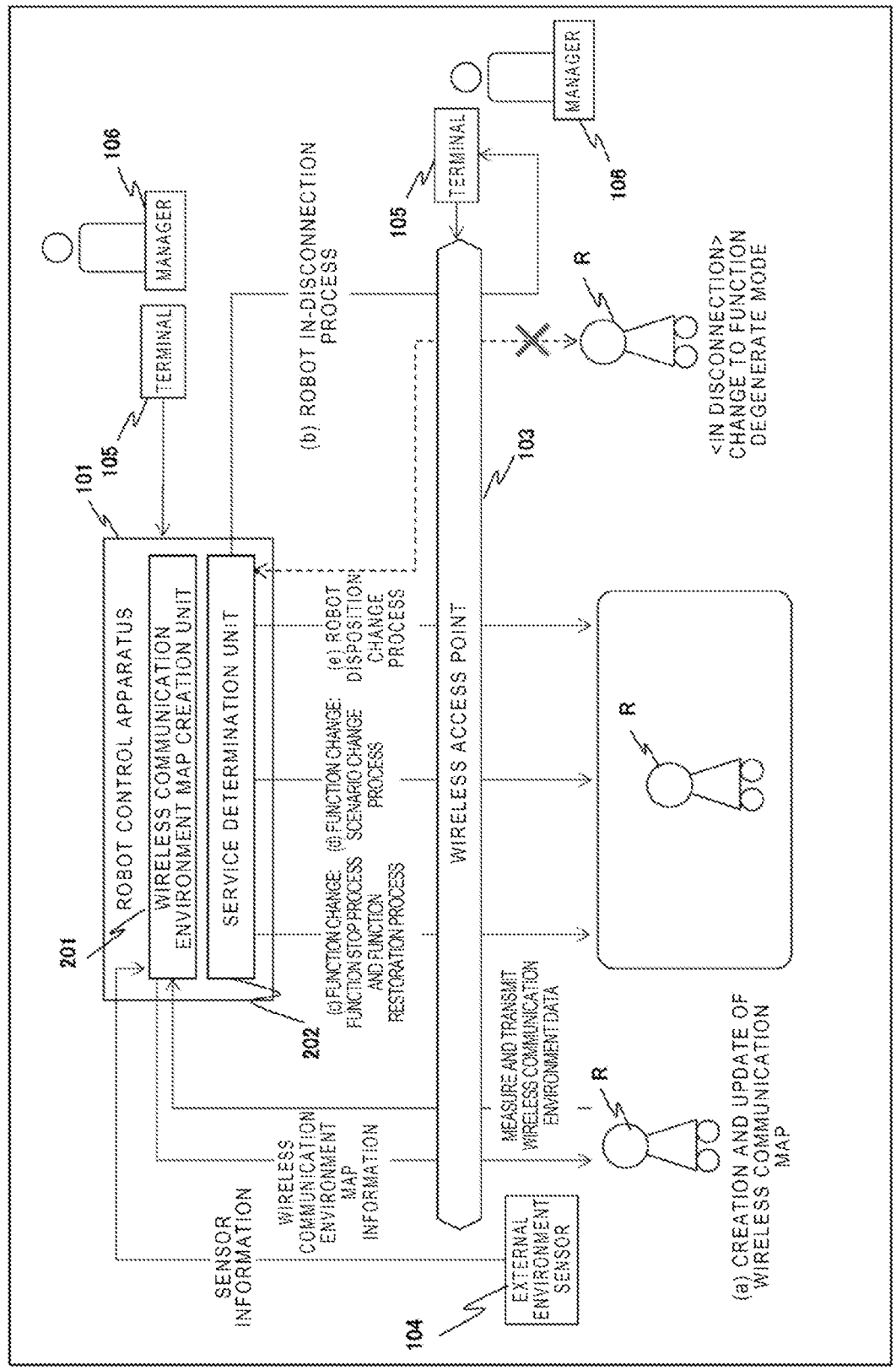
FIG. 4 is a schematic view showing an example of an entire operation according to an embodiment.

FIG. 4 is a schematic view showing an example of an entire operation of this embodiment. In FIG. 4, only the wireless communication environment map creation unit 201 and the service determination unit 202 are shown with respect to the robot control apparatus 101, for ease of illustration. A robot control system shown in FIG. 4 is a system that utilizes the robot control apparatus 101 and the robot R described with reference to FIGS. 2 and 3, and executes the following processes.

(a) Creation and update of wireless communication environment map
Service change process based on the following wireless communication environments
(b) Robot in-disconnection process
(c) Function change: function stop and restoration processes
(d) Function change: scenario change process
(e) Robot disposition change process These service change processes are mainly divided into the function change process and the robot disposition change process. Further, the function change process is divided into the function stop and restoration processes and the scenario change process. Hereinafter, the above-mentioned processes (a), (b), (c), (d), and (e) in the robot control system in this embodiment will be sequentially described with reference to FIGS. 4 to 14.

Creation and Update of Wireless Communication Environment Map

The wireless communication environment map 205a stored in the storage unit 205 of the robot control apparatus 101 includes map data on a movement assumption area where the robot R moves and wireless communication environment data in the movement assumption area. The wireless communication environment data is a collection of data such as a wireless intensity, a communication speed, a delay, a communication time, a distance from the closest wireless access point, and the like, and is measured by each robot R. The wireless communication environment map 205a is created and updated by the wireless communication environment map creation unit 201 of the robot control apparatus 101.

As shown in (a) of FIG. 4, the wireless communication environment data is measured by the wireless communication environment measurement unit 303 of the robot R, and then, is transmitted to the robot control apparatus 101. The robot control apparatus 101 reflects the received wireless communication environment data into the wireless communication environment map to update the wireless communication environment map 205a. The robot control apparatus 101 transmits the wireless communication environment map 205a to each robot R, and the wireless communication environment map 205a is stored in the storage unit 306 of each robot R as the wireless communication environment map 306a. The wireless communication environment map 205a and the wireless communication environment map 306a are equivalent to each other, but the wireless communication environment map 205a stored in the storage unit 205 of the robot control apparatus 101 is in the latest state in terms of timings of transmission and reception. The updating of the wireless communication environment map 205a may be periodically performed, or may be performed at a timing instructed by the manager 106, for example. Further, the wireless communication environment data to be transmitted to the robot control apparatus 101 by the robot R may be periodically transmitted, or may be transmitted together with other data.

Figure 5:
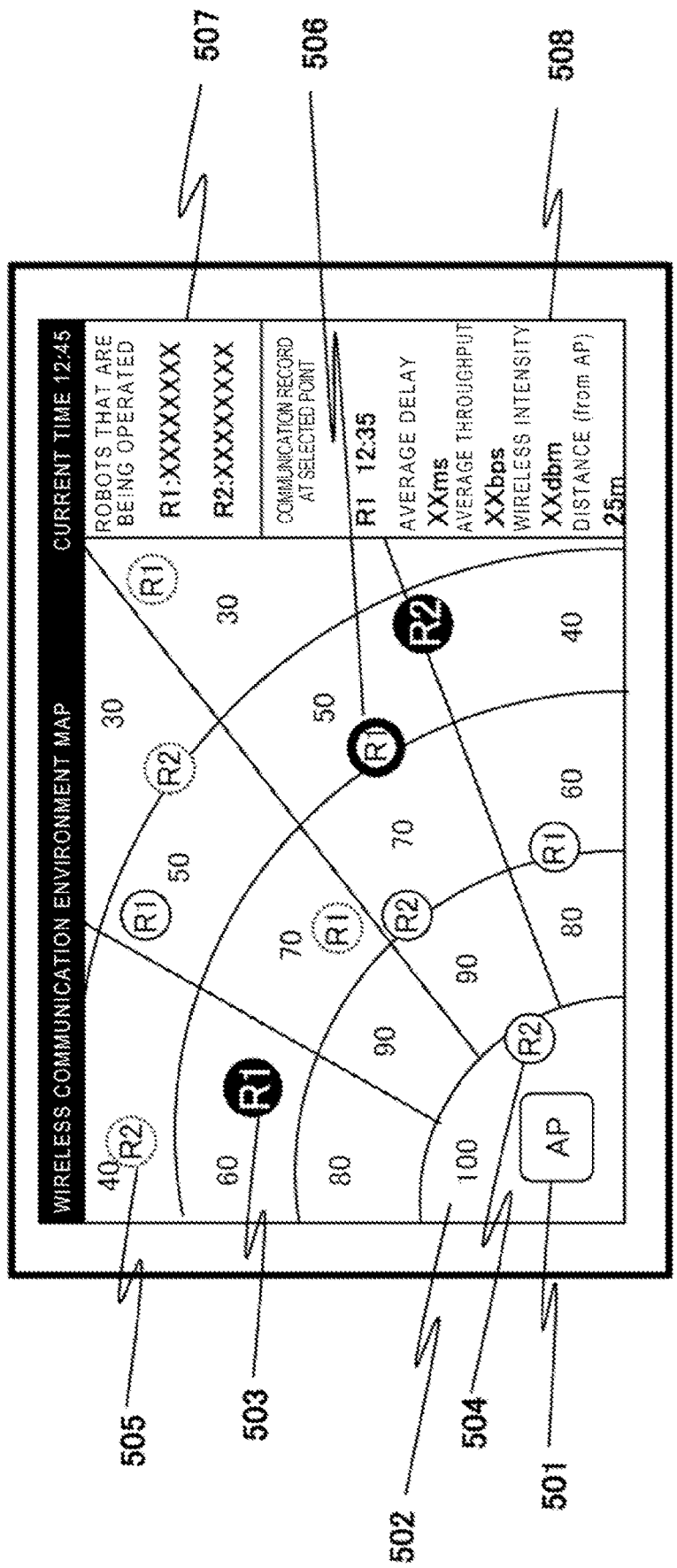
FIG. 5 is a diagram showing an example of a wireless communication environment map according to an embodiment.
Figure 6:
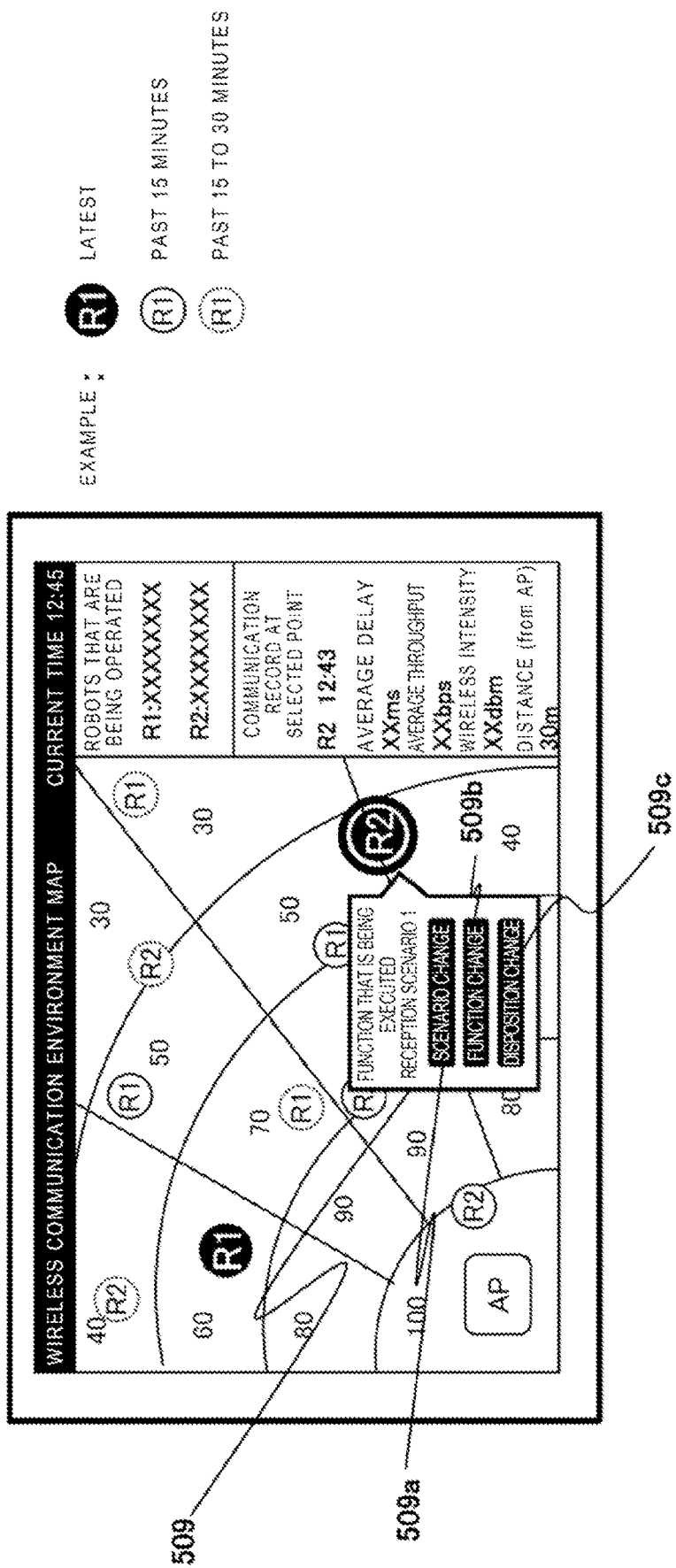
FIG. 6 is a diagram showing an example of a wireless communication environment map according to an embodiment.

FIGS. 5 and 6 show an example of the wireless communication environment map 205a. In this example, the manager 106 refers to the wireless communication environment map 205a of the robot control apparatus 101 using the terminal 105, or the manager 111 refers to the wireless communication environment map 205a using the terminal 110 by the manager 111. An initial map is set by measuring a place of an access point and an intensity from the access point in advance, or is set in accordance with a distance from the access point. The wireless communication environment map may employ the wireless communication environment map 205a that is stored as a database in the storage unit 205, instead of shapes as shown in FIGS. 5 and 6. Particularly, in a case where the process is performed without going through the manager 106 or the manager 111, for example, the wireless communication environment map 205a that is stored as the database may be used, instead of the shown wireless communication environment map 205a.

The communication intensity becomes stronger as the robot becomes closer to an access point and becomes weaker as the robot becomes more distant therefrom, but the communication intensity is changed due to environmental influences such as obstacles, shapes of buildings, or other radio waves. The wireless communication environment map 205a is configured by accumulating wireless communication environment data transmitted from the robots R by the wireless communication environment map creation unit 201. Thus, it is possible to more accurately measure a communication environment of the movement assumption area as the number of times of communication becomes larger.

Respective items shown in FIGS. 5 and 6 are as follows. For example, FIGS. 5 and 6 show an environment in which two robots R are operated, in which two robots R are represented as R1 and R2. FIG. 5 corresponds to a case where the manager 106 selects the robot R1 that is being operated, and FIG. 6 corresponds to a case where the manager 106 selects the robot R2 that is being operated.

501 Position of wireless access point AP

502 Partial wireless communication intensity area centering around wireless access point

503 Latest communication record of robot R1

504 Communication record of robot R1 (for example, within past 15 minutes)

505 Communication record of robot R1 (for example, within past 15 minutes to 30 minutes)

506 Communication record of robot R that is being selected on manager screen

507 Display indicating current statuses of robots R1 and R2

508 Data on communication record of robot R1 that is being selected on manager screen

509 Menu displayed in a case where latest communication record of robot R2 is selected

509a Scenario change select button of robot R2

509b Function change select button of robot R2

509c Disposition change select button of robot R2

A numeral shown in the area 502 represents a communication intensity, for example. Further, it is not necessary that the numeral is a value directly indicating the communication intensity, and the numeral may be a value obtained by adding other environment conditions to the communication intensity. For example, the numeral may be a value indicating an average value of communication intensities of wireless communication environment data transmitted from the respective robots R in each area 502. The numeral shown in the area 502 may be a normalized value. In addition, the numeral may be represented as characters such as "strong" or "weak" the like. Further, in FIG. 5, the areas 502 are divided in a radial form centering around the wireless access point AP 501, but may be divided in other forms. The communication records (503, 504, and 505) are determined from a communication time when data transmission is performed, or the like. For example, the communication records are displayed as the communication record (latest) 503, the communication record (within past 15 minutes) 504, the communication record (within past 15 minutes to 30 minutes) 505, or the like, but may be displayed in a manner other than a three-stage manner, or the time interval may not be 15 minutes. The display 507 represents a situation of the robot R that is being operated, and for example, is the type of the robot R, an operation or stop situation thereof, the number of robots that are being operated, or the like.

It is assumed that the wireless communication environment map 205a shown in FIGS. 5 and 6 is accessed by the manager 106 or 111. For example, the manager 106 or 111 selects a communication record on a screen (506), the communication record data 508 is displayed. Further, the manager may change services of each robot R by operating the menu 509 on a usage screen. In FIG. 6, a function of the robot R2 that is being executed is a reception scenario 1, and it is possible to change the service using the scenario change select button 509a, the function change select button 509b, and the disposition change select button 509c.

Service Change Based on Wireless Communication Environment

Figure 7:
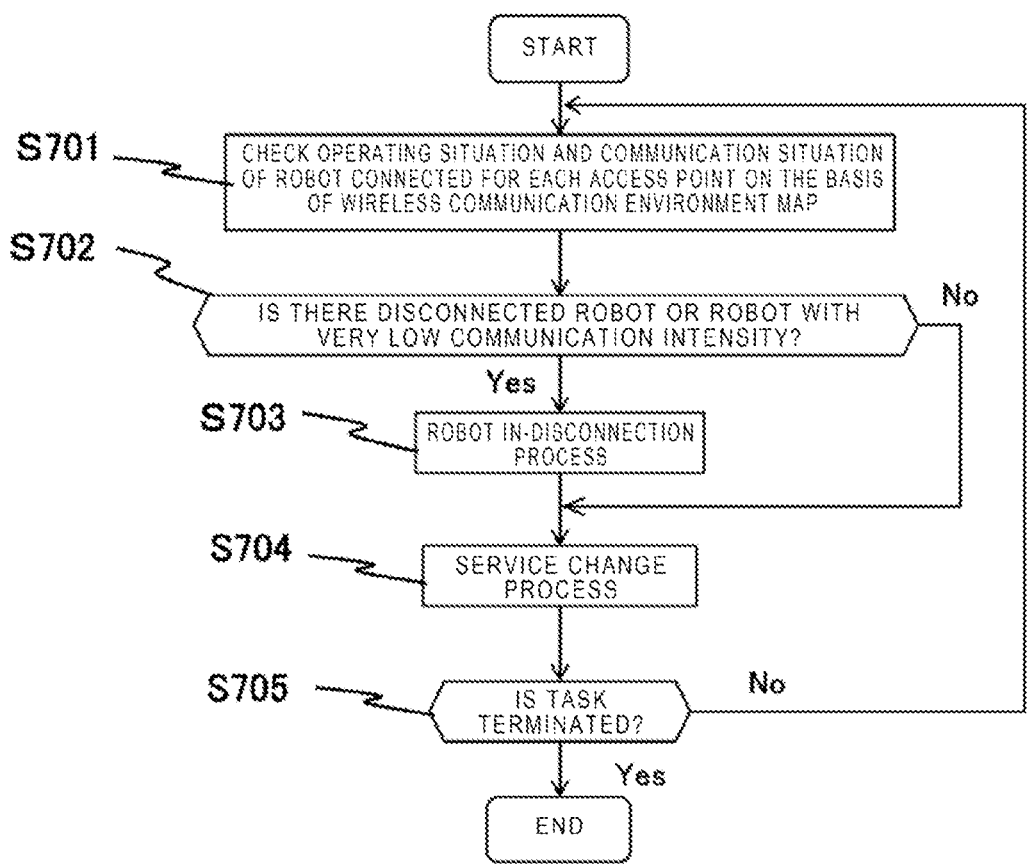
FIG. 7 is a diagram showing a schematic flowchart of the robot control apparatus in the entire operation of the robot control system according to an embodiment.

Next, service change based on a wireless communication environment in the robot control apparatus 101 will be described. FIG. 7 shows a flowchart of the robot control apparatus 101 for describing an example of an entire operation of the robot control system according to the embodiment.

As shown in FIG. 7, first, the robot control apparatus 101 checks an operation situation and a communication situation of robots R connected for each access point on the basis of the wireless communication environment map 205a (S701). Then, the robot control apparatus 101 checks whether there is a disconnected robot R or a robot R with a very low communication intensity (S702). In a case where the determination in S702 is YES, (b) the robot in-disconnection process is performed (S703). In a case where the determination in S702 is NO, S703 is skipped. Then, the service change process is performed (S704). In the service change process S704, according to wireless communication environments, (c) the function stop and restoration processes and (d) the scenario change process are performed, and (e) the robot R disposition change process is performed, as function changes. As necessary, a process to be performed is selected from the function change processes and the disposition change process, or a plurality of processes are performed in combination. Finally, in a case where the determination in S705 is YES, the task is terminated, and in a case where the determination in S705 is NO, the procedure returns to S701.

Figure 8:
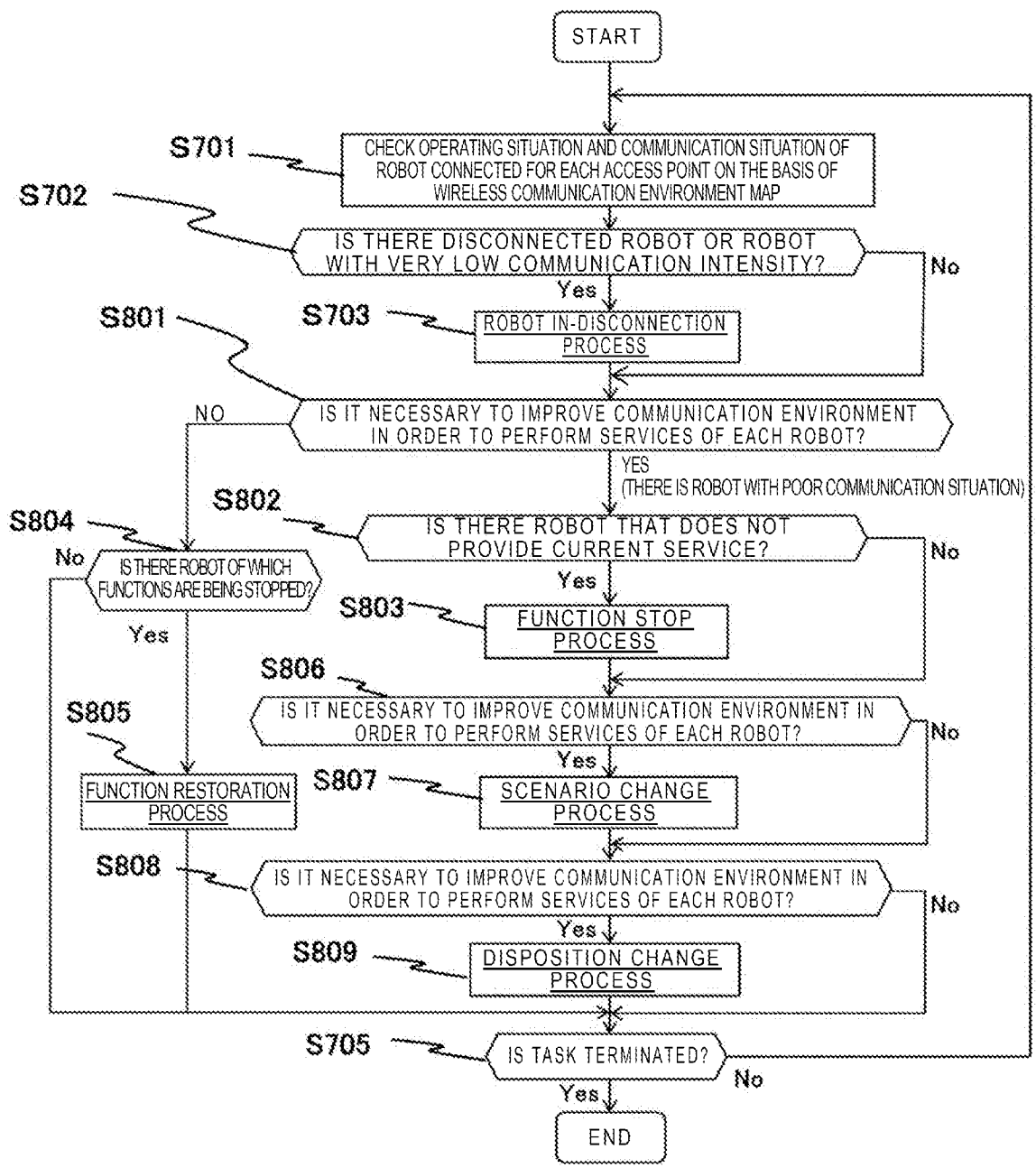
FIG. 8 is a diagram showing a flowchart for specifically describing a service change process of the robot control apparatus in FIG. 7, according to an embodiment.

FIG. 8 shows an example of a flowchart for specifically describing the above-described service change process of the robot control apparatus in the robot control system according to the embodiment. After the robot in-disconnection process (S703) is performed, it is checked whether it is necessary to improve a communication environment in order to perform services of each robot R (S801). That is, it is checked whether each robot R is in a communication situation in which the robot R is capable of performing services. In a case where there is a robot of which a communication situation is problematic (S802), it is checked whether there is a robot R that does not provide services (S802). In a case where the determination in S802 is YES, a function stop process (S803) of the robot (which will be described later) is performed. In a case where the determination in S802 is NO, S803 is skipped. Then, it is checked again whether it is necessary to improve the communication environment in order to perform services of each robot R (S806). In a case where the determination in S806 is YES, a scenario change process (S807) (which will be described later) is performed. In a case where the determination in S806 is NO, S807 is skipped. Then, it is checked again whether it is necessary to improve the communication environment in order to perform services of each robot R (S808). In a case where the determination in S808 is YES, a disposition change process (S809) (which will be described later) is performed. In a case where the determination in S808 is NO, S809 is skipped.

On the other hand, in S801, in a case where there is no problems in the communication situations of all the robots R and it is not necessary to improve the communication situations, it is checked whether there is a robot R of which the function is stopped (S804). In a case where the determination in S804 is YES, a function restoration process (which will be described later) (S805) is performed. In a case where the determination in S804 is NO, S805 is skipped.

Subsequently, the robot in-disconnection process and the service change process will be described in detail.

Robot in-Disconnection Process

Figure 9:
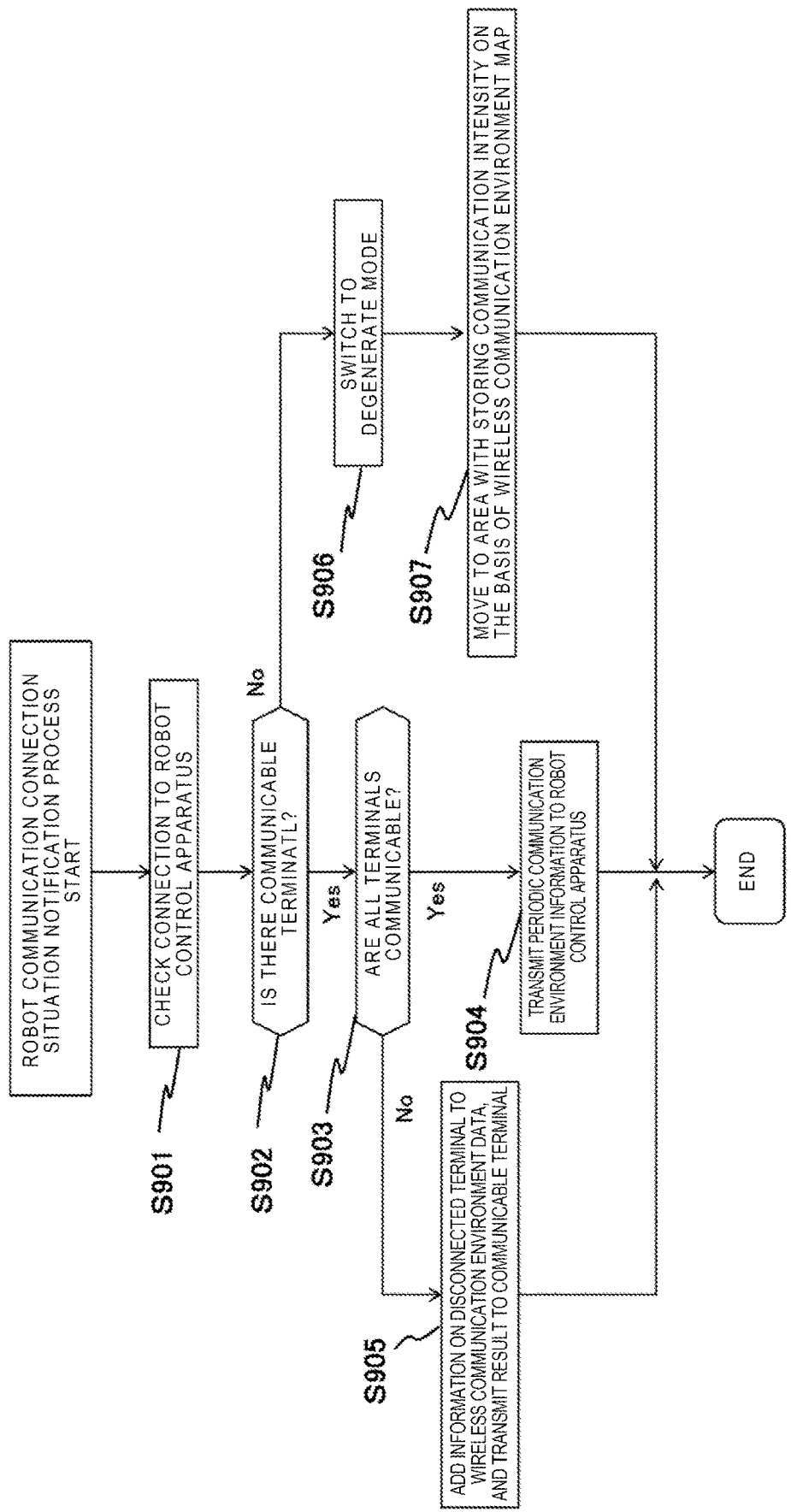
FIG. 9 is a diagram showing a flowchart of a communication connection situation notification process of a robot, according to an embodiment.

In a case where communication between the robot R and the robot control apparatus 101 is disconnected, the robot in-disconnection process is performed by both of the robot R and the robot control apparatus 101. FIG. 9 is a flowchart of a communication connection situation notification process of the robot R. The robot in-disconnection process will be described using the processing flow of FIG. 9. First, a communication packet or the like is transmitted to the robot control apparatus 101, and connection is checked (S901). The robot control apparatus 101 may include one or more computers, and may perform connection check with respect to a plurality of computers or servers relating to the robot control system 100, connected to the network 102 in S901. In a case where there is a communicable terminal (S902) and the connection check can be performed with respect to all confirmed terminals (S903), wireless communication environment data is transmitted to the robot control apparatus 101 (S904), and then, the process is terminated. In a case where there is a disconnected terminal is present in S903, information on the disconnected terminal is added to the wireless communication environment data in S905, and then, the result is transmitted to a communicable terminal.

Further, in a case where there is no communicable terminal in S902, and in a case where even if there is a connectable terminal, a communication response rate exceeds a predetermined threshold value, services of the robot R are switched to a degenerate mode in S906. A scenario in the degenerate mode may be set in advance in the service scenario 306b for switching. In the degenerate mode, voice recognition or figure detection for an end user is performed inside the robot R using the voice processing unit 305a or the image processing unit 305b of the robot R. Since resources in the robot R are limited, a response in this case is performed by using minimum necessary dialogue, for example, by performing only the same answer or several patterns of answers with respect to voice input from the end user. In addition, in the degenerate mode, the robot R autonomously moves to an area where the communication intensity is high, such as the vicinity of an access point, on the basis of the wireless communication environment map 306a (S907). In S907, it is also possible to utter a state of the robot R itself, for example, "wireless communication with a management center is disconnected. I am going to move to a connection point."

Figure 10:
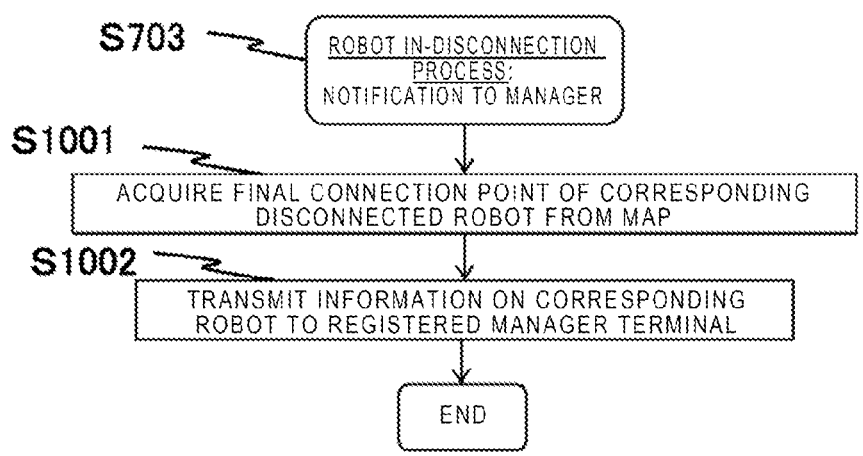
FIG. 10 is a diagram showing a flowchart of an example of a robot in-disconnection process, according to an embodiment.

On the other hand, the robot control apparatus 101 checks situations of all the robots R connected to an access point checked in S701 in FIG. 7, for example, and in a case where there is a disconnected robot R (S702), the robot in-disconnection process is performed (S703). FIG. 10 shows an example of a flow of the robot in-disconnection process. First, a point where the corresponding disconnected robot R finally notifies wireless communication environment data is acquired using the wireless communication environment map 205a (S1001). Then, the point is notified to a tablet terminal possessed by the field manager 106 or the like, for example, to the terminal 105 in FIG. 4 (S1002). Alternatively, a site may be imaged with the external environment sensor 104 such as a monitoring camera being directed toward a final connection point acquired in S1001, and an imaging result may be notified to the terminal 105. Alternatively, a different communicable robot R may move to the point acquired in S1001, a situation is checked by the camera 307a, the microphone 307b, and the 3D scanner sensor 307d of the communicable robot R, and the checked information may be transmitted to the manager terminal 105.

Function Change: Function Stop and Restoration Processes

Figure 11A:
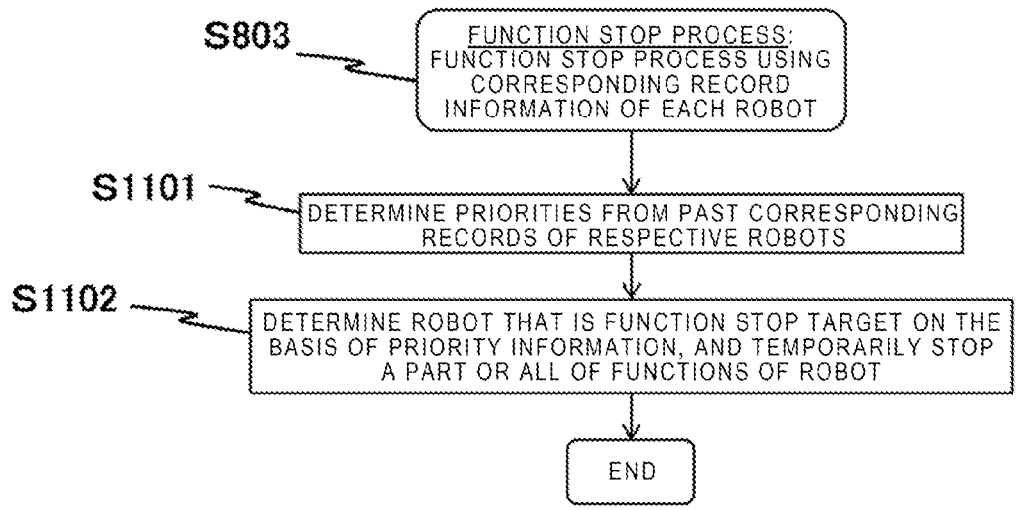
FIGS. 11A and 11B are diagrams showing flowcharts of examples of a function stop process, according to an embodiment.
Figure 11B:
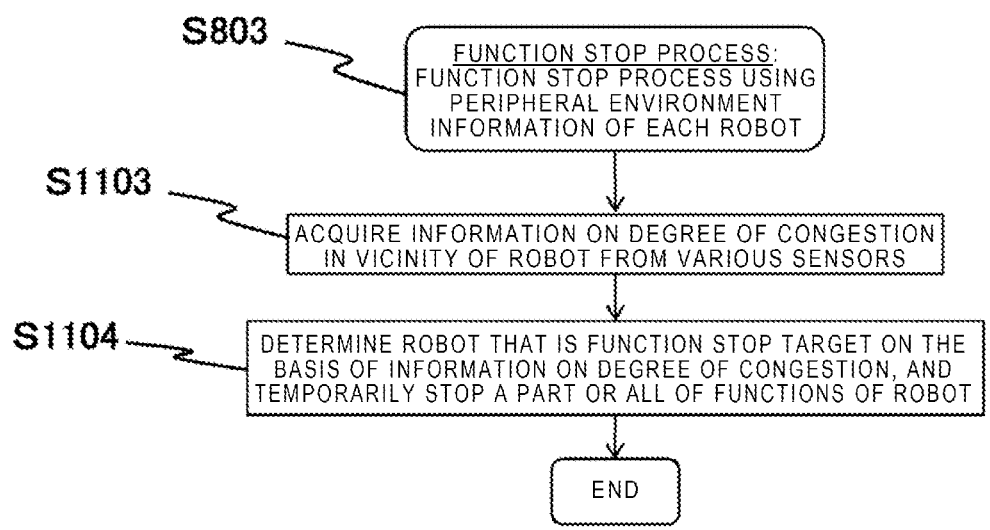

Next, the function stop process S803 will be described. FIGS. 11A and 11B show examples of the function stop process S803 of the robot in FIG. 8. This process is performed to specify a robot R of which functions are stopped or that are completely stopped from robots R that are being operated, and to stop the functions, on the basis of a rule. Through this process, it is possible to perform services even in a state where the amount of communication of the robot R is reduced and its wireless communication environment is poor. As an example of the rule, a function stop process using corresponding record information of each robot in FIG. 11A will be described. First, a plurality of robots R are compared with each other in terms of past corresponding records, recognition rates, or the like of each robot R, among robots R that do not provide services, and their priorities are determined (S1101). Further, for example, data on the corresponding records, the recognition rates, or the like is accumulated in the robot management tables 205c and 306c for each robot R for use. Then, a robot R that is a function stop target is determined on the basis of the priority information, and a part or all of a microphone function and a camera function of the corresponding robot R are temporarily stopped (S1102). The number of robots R that are function stop targets and functions to be stopped are based on a set rule. As an example of the rule, a robot R with the lowest priority is stopped, for example. Further, as another example, in a case where a plurality of cameras 307a or microphones 307b are mounted, a half or all of the cameras or microphones are stopped, for example. As the number of cameras 307a or microphones 307b is reduced, image recognition, voice recognition performance, or the like is lowered, but the amount of communication of data transmitted by the robot R can be reduced. Further, the number of robots R that are function stop targets may be plural.

As the next example, a function stop process using peripheral environment information of each robot in FIG. 11B will be described. First, information on the degree of congestion in the vicinity of each robot R is acquired from the external environment sensor 104 such as a monitoring camera, or a mounted sensor of the robot R (S1103). Then, a robot R that is a function stop target is determined as a robot R with a low possibility of providing services, for example, due to a reason that there are few people, or is determined according to the degree of congestion in the entire area, and then, a part or all of a microphone function or a camera function of the corresponding robot R are temporarily stopped (S1104). Further, the number of robots R of which functions are to be stopped or the functions to be stopped are based on a set rule. The number of robots to be operated is changed in accordance with the degree of congestion. For example, in a case where the degree of congestion is low, only one robot R is operated.

Figure 12A:
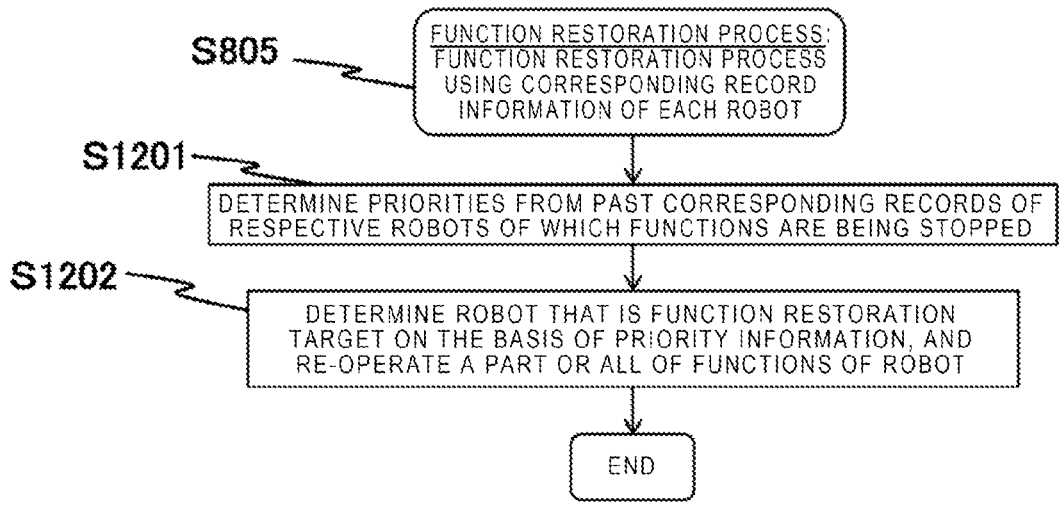
FIGS. 12A and 12B are diagrams showing flowcharts of examples of a function restoration process, according to an embodiment.
Figure 12B:
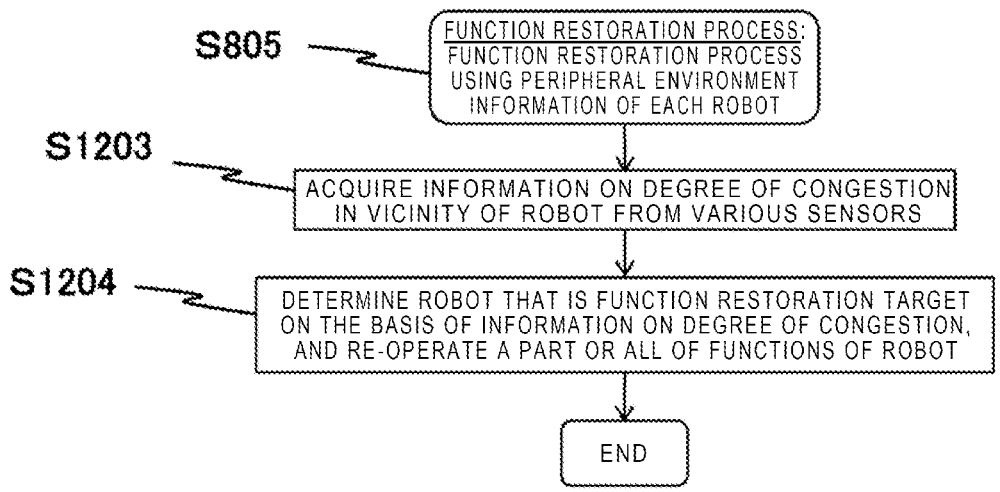

Next, the function restoration process will be described. FIGS. 12A and 12B show examples of the function restoration process S805 in FIG. 8. This process is performed to select a robot R of which functions are to be restored from robots R of which functions are stopped or that are completely stopped, and the functions are restored or re-operated, on the basis of a rule. As an example of the rule, a function restoration process using corresponding record information of each robot in FIG. 12A will be described. First, a plurality of robots R are compared with each other in terms of past corresponding records, recognition rates, or the like of each robot R, among robots R of which functions are stopped, and their priorities of the robots R are determined (S1201). Then, a part or all of a microphone function or a camera function of a robot R with a secondly highest priority are re-operated (S1202). The number of robots R of which functions are to be restored or the functions are based on a set rule. For example, communication records such as average delays of respective robots R of which functions are being stopped are equal to or greater than a set threshold value, functions of all the robots R are restored. Alternatively, a robot R is selected according to priorities from the robots R of which functions are being stopped, according to a current communication capacity of a wireless communication network, to restore its functions.

As the next example, a function restoration process using peripheral environment information of each robot in FIG. 12B will be described. First, information on the degree of congestion in the vicinity of each robot R is acquired from the external environment sensor 104 such as a monitoring camera, or a mounted sensor of the robot R (S1203). Then, a robot R that is a function restoration target is determined as a robot R with a high possibility of providing services, for example, due to a reason that there are many people, or is determined according to the degree of congestion in the entire area, and then, a part or all of a microphone function or a camera function of the corresponding robot R are re-operated (S1204). Further, the number of robots R of which functions are to be re-operated or the functions to be operated are based on a set rule. For example, the number of robots to be operated is changed in accordance with the degree of congestion. For example, in a case where the degree of congestion is high, the number of robots R to be operated is increased.

With respect to the function stop process and the function restoration process shown in FIGS. 11A to 12B, it is possible to achieve an effect of adaptably matching communication bands to perform services, and also, an effect with respect to an operating time of the robot R. Which effect is to be made important may be set according to a rule, may be input in advance through an initial setting, or may be set by the manager 106 through the terminal 105 as necessary. Change in the rule may be set using a wireless environment map.

Function Change: Scenario Change Process

Figure 13:
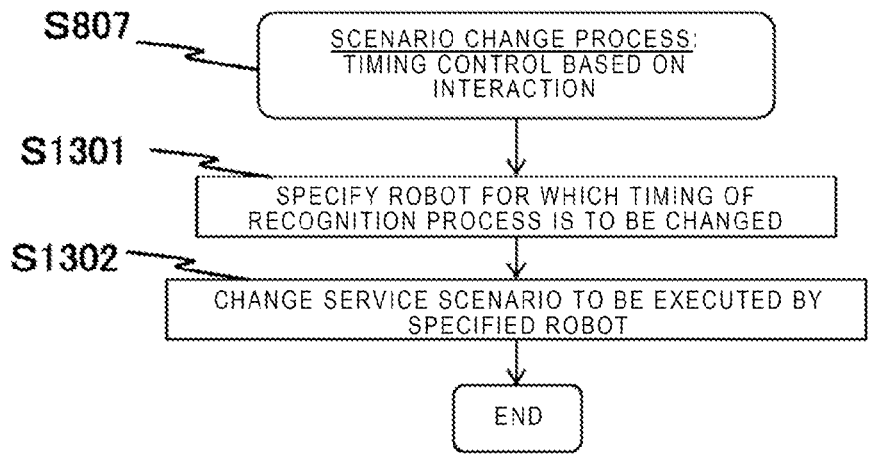
FIG. 13 is a diagram showing a flowchart of an example of a scenario change process, according to an embodiment.

The scenario change process S807 will be described. The process is an example of a process in a case where the above-described service determination unit determines whether to change an existing service scenario on the basis of a latest wireless environment map and changes the existing service scenario. FIG. 13 shows an example of the scenario change process S807 in FIG. 8. This process is performed to specify a robot R of which a service scenario is to be changed from robots R that are being operated, and to change the scenario, on the basis of a rule. As an example of the rule, a timing control process due to interaction shown in FIG. 13 will be described. For example, in a case where two or more robots R performs reception guidance services at the same time, a robot R that deviates from a timing of a process with a high communication load, for example, voice recognition or image recognition is specified (S1301). Then, in order to delay the timing of recognition of the specified robot R, a service scenario to be executed by the specified robot R is changed (S1302). As an example of the service scenario in S1302, for example, a scenario for continuously performing utterance for a time necessary for adjustment without performing voice recognition may be employed. Further, a scenario to be processed only in the robot R may be applied with respect to voice input from an end user. Through this scenario change process, it is possible to reduce a situation in which a plurality of robots R transmit data to the robot control apparatus 101 at the same time, and thus, to reduce the influence on a wireless communication environment. Further, with respect to the specified robot R, the reception guidance service may be changed to an advertising service for executing only utterance or a service with less communication data to be further transmitted.

Robot Disposition Change Process

Figure 14A:
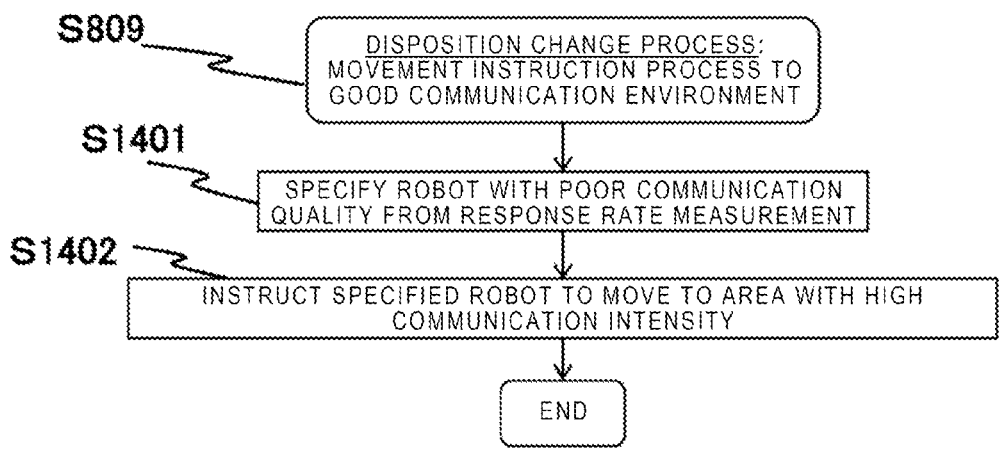
FIGS. 14A and 14B are diagrams showing flowcharts of examples of a disposition change process, according to an embodiment.
Figure 14B:
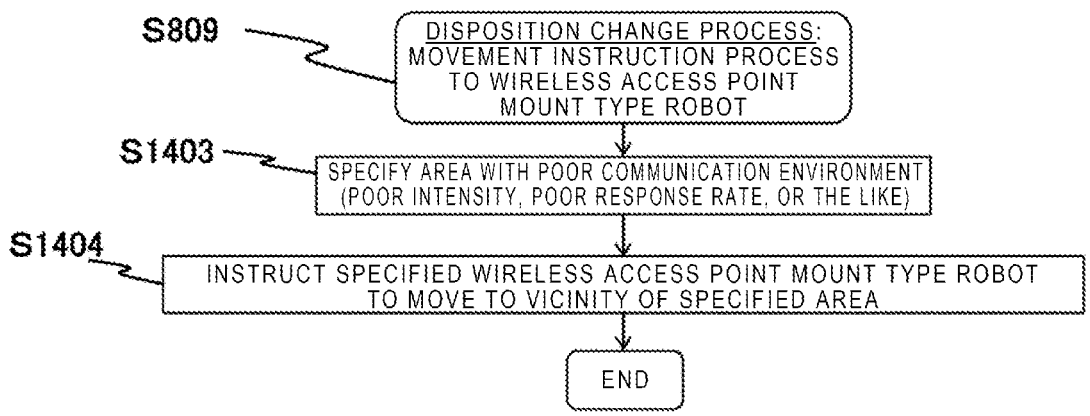

The robot disposition change process S809 will be described. FIGS. 14A and 14B show examples of the disposition change process S809 in FIG. 8. This process is performed to specify a robot R of which disposition is to be changed from robots R that are being operated, and to instruct its movement, on the basis of a rule. As an example of the rule, a movement instruction process for a good communication environment shown in FIG. 14A will be described. First, a robot R that is present in an area with a low communication intensity is specified from a wireless communication environment map (S1401). For example, a robot R in which a communication response rate or the like exceeds a predetermined threshold value is specified. Then, the specified robot R is instructed to move up to an area with a high communication intensity (S1402). Through this process, for example, even in a case where the robot R is guided to move to a place distant from a wireless access point in an immediately previous reception guidance service, it is possible to move the robot R to an area with a high communication intensity, and continuously perform services while continuously performing voice recognition or image recognition or without lowering a performance such as a recognition rate. Further, although not shown, for example, in a case where a guidance service for a place distant from an access point is executed, it is also possible to provide, while stopping a partial function of a specific robot R itself, a movement guidance service with respect to the robot R.

As the next example, as shown in FIG. 14B, a movement instruction process of a movement robot R in which a wireless access point is mounted will be described. First, an area in which a communication environment such as an intensity or a response rate is poor is specified from a wireless communication environment map (S1403). Then, the wireless access point mounted robot R is instructed to move to the vicinity of the specified area (S1404). Even in a case where an area with a poor communication environment is generated due to the influence of an obstacle or another communication, by moving the wireless access point mounted robot R through this process, it is possible to enhance the communication intensity or the like, to thereby improve the communication environment. Further, even in a case where the environment is changed in real time, since the robot control apparatus 101 gives a movement instruction to the wireless access point mounted robot R, it is possible to adjust the environment.

According to the above-described various embodiments of the present invention, even in a case where a communication situation is changed from an environment that is initially set due to the degree of congestion of persons, an obstacle, installation of other devices such as a monitoring camera and change in usage situations thereof, change in operation situations of the robot R, or the like, in service management, it is possible to adaptably match communication resources between a plurality of robots R to appropriately perform services. Further, by controlling the functions of a robot R that is being operated and the number of such robots R, it is possible to reduce the amount of consumed power in a battery, and to increase the operating time of the robot R.

The present invention is not limited to the above-described embodiments, and may include various modification examples. For example, the above-described embodiments have been specifically described for understanding of the present invention, and thus, it is not essential that the entirety of the above-described configurations are provided in the present invention. Further, with respect to a part of the configurations of the embodiments, addition, deletion, and exchange of other configurations may be available.

Furthermore, with respect to the above-described functional components, processing units, and the like, an example in which a program of a CPU for realizing a part or all of the functional components, processing units, and the like is created has been described, but the part or the entirety thereof may be realized by hardware through an integrated circuit design, or the like. That is, the entirety or a part of the functions of the processing units may be realized by an integrated circuit such as an application specific integrated circuit (ASIC) or a field programmable gate array (FPGA), for example, in place of the program.

What is claimed is:

1. A robot control apparatus that performs communication with a plurality of robots via a wireless access point, the apparatus comprising:
   a communication interface that performs communication with the plurality of robots according to a communication environment; and
   a processor programmed to:
   collect wireless communication environment data respectively transmitted from each of the plurality of robots through the communication interface, the wireless communication environment data from each respective robot includes at least a communication intensity received by the respective robot from the wireless access point,
   create a wireless communication environment map based on the collected wireless communication environment data collected from each of the plurality of robots, the wireless communication environment map including a position of the wireless access point, a plurality of communication intensities at a plurality of positions around the position of the wireless access point, a plurality of latest positions of the robots based on the latest collected wireless communication environment data, and a plurality of past positions of the robots based on the past collected wireless communication environment data for one or more past time intervals,
   display the wireless communication environment map,
   receive a selection of one of the collected wireless communication data via the wireless communication environment map,
   display the wireless communication environment map together with detailed information of the respective robot corresponding to the selected one of the collected wireless communication data, the detailed information including at least a time of the selected one of the collected wireless communication data and the communication intensity included in the of the selected one of the collected wireless communication data,
   upon determining that the selected one of the collected wireless communication data is one of the latest collected wireless communication environment data, further display the wireless communication environment map together with a menu which includes a scenario change select button, a function change select button and a disposition change select button for the respective robot corresponding to the selected one of the collected wireless communication data,
   receive a selection via the menu, and
   control the respective robot corresponding to the selected one of the collected wireless communication data based on the received selection via the menu.

2. The robot control apparatus according to claim 1, wherein the processor is programmed to:
   upon receiving a selection of the scenario change select button, execute a process to control the respective robot corresponding to the selected one of the collected wireless communication data to change a service scenario performed by the respective robot,
   upon receiving a selection of the function change select button, execute a process to control the respective robot corresponding to the selected one of the collected wireless communication data to change a function performed by the respective robot,
   upon receiving a selection of the disposition change select button, execute a process to control the respective robot corresponding to the selected one of the collected wireless communication data to change a disposition of the respective robot.

3. The robot control apparatus according to claim 2, wherein the processor is programmed to:
   collect sensor data respectively transmitted from each of the plurality of robots through the communication interface, and
   perform image processing or voice processing with respect to the received sensor data.

4. The robot control apparatus according to claim 2, wherein the processor is programmed to:
   in a case where one of the robots is disconnected, notify a position where the wireless communication environment data is finally collected from the disconnected robot.

5. The robot control apparatus according to claim 1, wherein the one or more past time intervals are each a same predetermined time interval.

6. A robot control system, comprising:
   a plurality of robots connected to a wireless access point; and
   a robot control apparatus configured to communicate with the plurality of robots via the wireless access point,
   wherein the robot control apparatus includes:
   a communication interface that performs communication with the plurality of robots according to a communication environment, and
   a processor programmed to:
   collect wireless communication environment data respectively transmitted from each of the plurality of robots through the communication interface, the wireless communication environment data from each respective robot includes at least a communication intensity received by the respective robot from the wireless access point,
   create a wireless communication environment map based on the collected wireless communication environment data collected from each of the plurality of robots, the wireless communication environment map including a position of the wireless access point, a plurality of communication intensities at a plurality of positions around the position of the wireless access point, a plurality of latest positions of the robots based on the latest collected wireless communication environment data, and a plurality of past positions of the robots based on the past collected wireless communication environment data for one or more past time intervals, display the wireless communication environment map, receive a selection of one of the collected wireless communication data via the wireless communication environment map, display the wireless communication environment map together with detailed information of the respective robot corresponding to the selected one of the collected wireless communication data, the detailed information including at least a time of the selected one of the collected wireless communication data and the communication intensity included in the of the selected one of the collected wireless communication data, upon determining that the selected one of the collected wireless communication data is one of the latest collected wireless communication environment data, further display the wireless communication environment map together with a menu which includes a scenario change select button, a function change select button and a disposition change select button for the respective robot corresponding to the selected one of the collected wireless communication data, receive a selection via the menu, and control the respective robot corresponding to the selected one of the collected wireless communication data based on the received selection via the menu.

7. The robot control system according to claim 6, wherein the processor is programmed to:

upon receiving a selection of the scenario change select button, execute a process to control the respective robot corresponding to the selected one of the collected wireless communication data to change a service scenario performed by the respective robot, upon receiving a selection of the function change select button, execute a process to control the respective robot corresponding to the selected one of the collected wireless communication data to change a function performed by the respective robot, upon receiving a selection of the disposition change select button, execute a process to control the respective robot corresponding to the selected one of the collected wireless communication data to change a disposition of the respective robot.

8. The robot control system according to claim 7, wherein the processor is programmed to:

collect sensor data respectively transmitted from each of the plurality of robots through the communication interface, and perform image processing or voice processing with respect to the received sensor data.

9. The robot control system according to claim 7, wherein the processor is programmed to:

in a case where one of the robots is disconnected, notify a position where the wireless communication environment data is finally collected from the disconnected robot.

10. The robot control system according to claim 6, wherein the one or more past time intervals are each a same predetermined time interval.

11. A robot control method in a robot control apparatus that performs communication with a plurality of robots via a wireless access point, the robot control method comprising:

performing communication with the plurality of robots according to a communication environment of the wireless access point;

collecting wireless communication environment data respectively transmitted from each of the plurality of robots through the communication interface, the wireless communication environment data from each respective robot includes at least a communication intensity received by the respective robot from the wireless access point, creating a wireless communication environment map based on the collected wireless communication environment data collected from each of the plurality of robots, the wireless communication environment map including a position of the wireless access point, a plurality of communication intensities at a plurality of positions around the position of the wireless access point, a plurality of latest positions of the robots based on the latest collected wireless communication environment data, and a plurality of past positions of the robots based on the past collected wireless communication environment data for one or more past time intervals;

displaying the wireless communication environment map;

receiving a selection of one of the collected wireless communication data via the wireless communication environment map;

displaying the wireless communication environment map together with detailed information of the respective robot corresponding to the selected one of the collected wireless communication data, the detailed information including at least a time of the selected one of the collected wireless communication data and the communication intensity included in the of the selected one of the collected wireless communication data;

upon determining that the selected one of the collected wireless communication data is one of the latest collected wireless communication environment data, further displaying the wireless communication environment map together with a menu which includes a scenario change select button, a function change select button and a disposition change select button for the respective robot corresponding to the selected one of the collected wireless communication data;

receiving a selection via the menu; and controlling the respective robot corresponding to the selected one of the collected wireless communication data based on the received selection via the menu.

12. The control method according to claim 11, further comprising:

upon receiving a selection of the scenario change select button, execute a process to control the respective robot corresponding to the selected one of the collected wireless communication data to change a service scenario performed by the respective robot, upon receiving a selection of the function change select button, execute a process to control the respective robot corresponding to the selected one of the collected wireless communication data to change a function performed by the respective robot, upon receiving a selection of the disposition change select button, execute a process to control the respective robot corresponding to the selected one of the collected wireless communication data to change a disposition of the respective robot.

13. The control method according to claim 12, further comprising:
    collecting sensor data respectively transmitted from each of the plurality of robots through the communication interface; and
    performing image processing or voice processing with respect to the received sensor data.

14. The control method according to claim 12, further comprising:
    in a case where one of the robots is disconnected, notifying a position where the wireless communication environment data is finally collected from the disconnected robot.

15. The control method according to claim 11,
    wherein the one or more past time intervals are each a same predetermined time interval.

* * * * *